May 9, 1950     L. G. LINDSAY ET AL     2,507,343
VALVE CONTROL MECHANISM FOR WATER SOFTENING APPARATUS
Filed Dec. 14, 1946     2 Sheets-Sheet 1
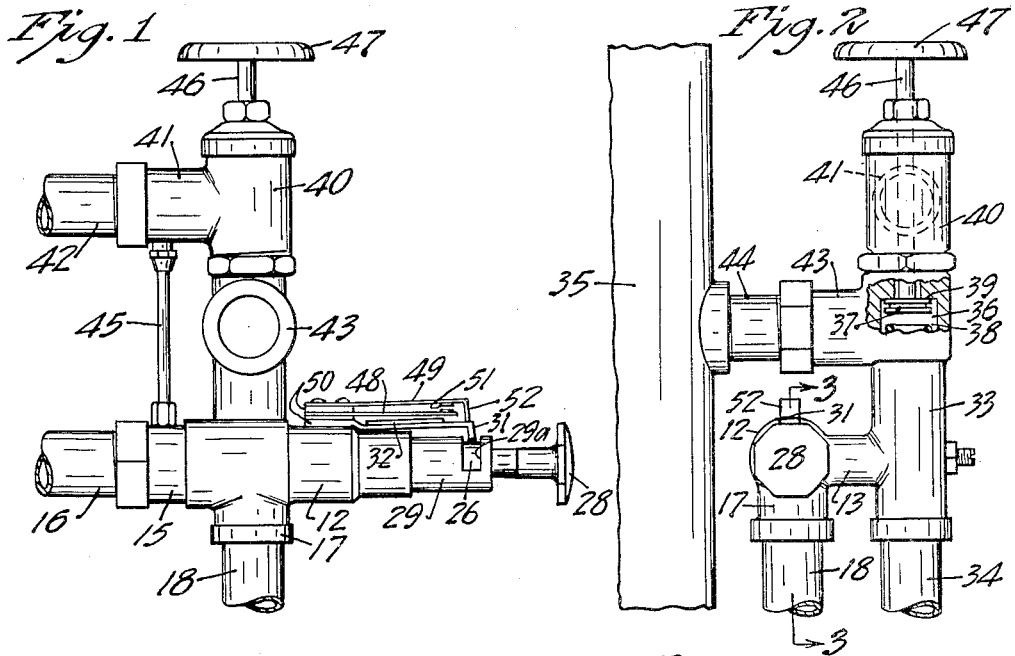
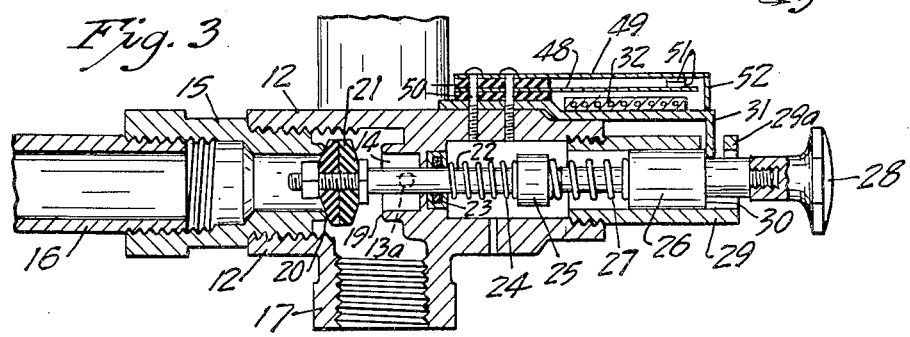
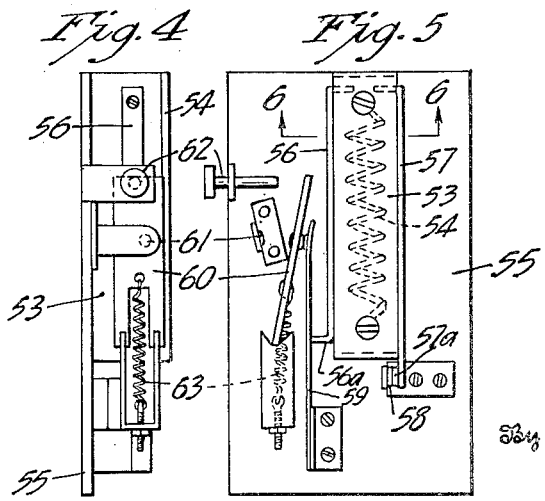
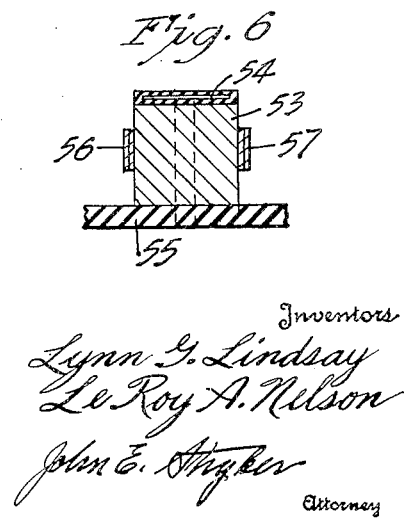
Inventors
Lynn G. Lindsay
LeRoy A. Nelson
John E. Stryker
Attorney May 9, 1950 L. G. LINDSAY ET AL 2,507,343
VALVE CONTROL MECHANISM FOR WATER SOFTENING APPARATUS
Filed Dec. 14, 1946 2 Sheets-Sheet 2
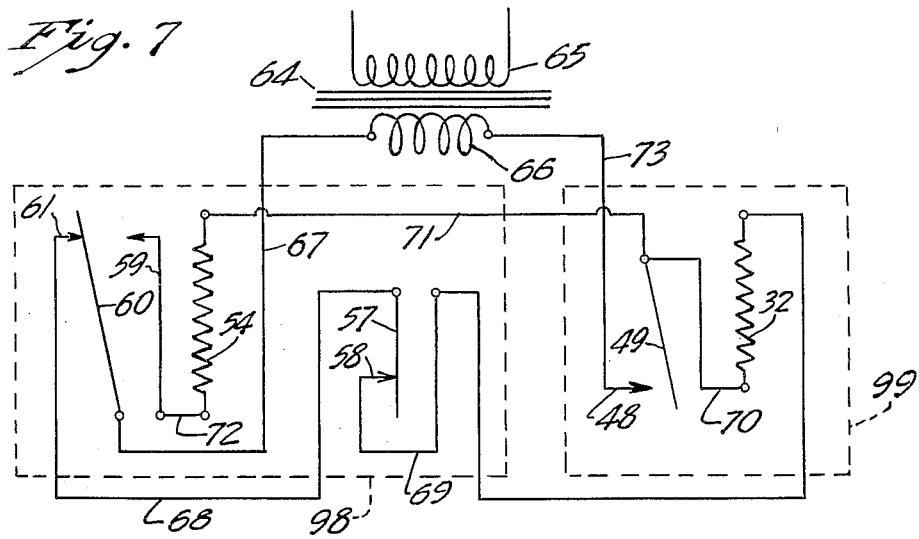
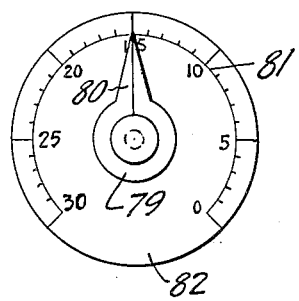
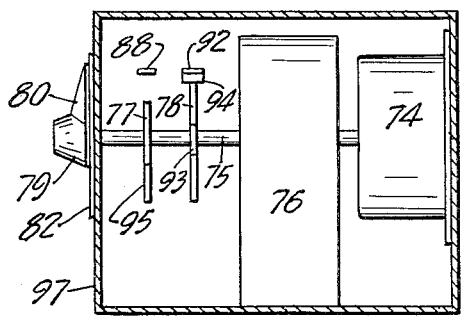
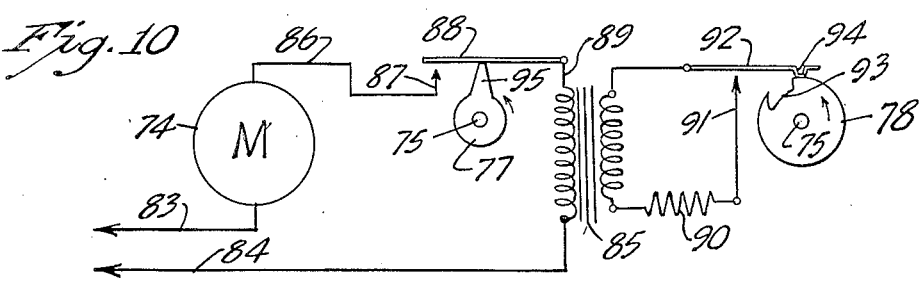
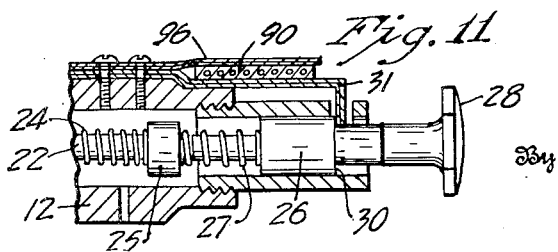
Inventors
Lynn G. Lindsay
LeRoy A. Nelson
John E. Stryker
By
Attorney Patented May 9, 1950

2,507,343

UNITED STATES PATENT OFFICE 2,507,343

VALVE CONTROL MECHANISM FOR WATER-SOFTENING APPARATUS

Lynn G. Lindsay, St. Paul, Minn., and Le Roy A. Nelson, Dearborn, Mich.; said Nelson assignor to said Lindsay Application December 14, 1946, Serial No. 716,310

5 Claims. (Cl. 161—7)

1

This invention relates to valve control mechanism which is particularly, although not exclusively, adapted for use in connection with water softening apparatus wherein a body of softening material requires periodic regeneration.

It is an object of our invention to provide novel and reliable mechanism for controlling the duration of the regenerating treatment in connection with valve mechanism adapted to be manually set to terminate the softening operation and initiate the regenerating operation.

A further object is to provide an electrically operated control of this class which is simple and inexpensive and adapted to insure the quick operation of the valve mechanism at the end of a regenerating and flushing operation of predetermined duration.

A particular object is to provide a three-port, two-way control valve casing connected to the tank containing the softening material and to a service pipe and a drain pipe and having valve mechanism which is spring biased to place the tank in communication with a service pipe and to close the drain pipe in combination with an electrically operated control for the duration of the regenerating operation, including a heat responsive latch for temporarily holding the valve mechanism in position to close the service pipe and place the tank in communication with the drain pipe.

Other objects will appear and be more fully pointed out in the following specification and claims.

In the accompanying drawings which illustrate our invention by way of example and not for the purpose of limitation:

Figure 1 is a side elevational view showing the valve mechanism and heat responsive latch in normal water softening position;

Fig. 2 is an elevational view of the valve mechanism and latch as seen from the right of Fig. 1, with a portion of the valve casing broken away and also showing a suitable connection with a tank containing the water softening material;

Fig. 3 is a vertical section taken on the line 3—3 of Fig. 2, showing the valve mechanism in regenerating position;

Fig. 4 is a side elevational view showing one form of electrical time control;

Fig. 5 is a plan view of the control shown in Fig. 4;

Fig. 6 is a section taken on the line 6—6 of Fig. 5;

Fig. 7 is a wiring diagram for the same form of electric control;

Fig. 8 is a diagrammatic plan view showing another form of electric control wherein a synchronous motor or electric clock is employed to operate control switches;

2

Fig. 9 is a front elevational view showing the manual time control dial and pointer;

Fig. 10 is a wiring diagram showing the electrical connections and cams for operating the motor-driven time control, and Fig. 11 is a fragmentary vertical section through a portion of the valve casing and showing the heat responsive latch for use with controls of the type shown in Figs. 8, 9 and 10.

Referring to the drawings, our improved valve control mechanism has a valve casing indicated generally by the numeral 12 which is of the three-port, two-way type for use in connection with water softening apparatus. This casing has a branch 13 (Fig. 2) defining a port 13a in communication with a chamber 14, a branch 15 communicating with a service pipe 16 and a downwardly projecting branch 17 defining a port in communication with a pipe 18 extending to the bottom of the softener tank. The casing 12 is formed with annular valve seats 19 and 20 disposed in parallel relation one to the other. The valve mechanism includes a head 21 which is movable to close against either of the seats 19 or 20 and this head is mounted on a rod 22 extending in axial relation to the seats 19 and 20. The rod 22 has a fixed bearing 23 which is provided with a suitable resilient sealing ring embracing the rod. A helical spring 24 is confined on the rod 22 between the bearing 23 and a head 25 which is fixed on the outer end of the rod so that the head 21 is spring biased to normally closed position against the seat 19.

Mounted in axial alignment with the rod 22 is a plunger 26 carrying a spring 27 for engagement with the head 25 at one end and fitted with a manually operable handle 28 at its other end. The spring 27 is stiffer than the spring 24 and is arranged to be partially compressed when the valve head 21 is closed against its seat 20. A tubular extension 29 of the valve casing 12 affords a bearing for the plunger 26 and the latter is formed with an annular shoulder 30 adapted to be engaged by a latch member 31 for retaining the head 21 in engagement with the seat 20 against the bias of the spring 24.

The latch member 31 is a heat responsive, resilient, bi-metallic bar which is fastened at one end to the valve casing 12 and is normally biased so that its free end projects through a slot 29a in the casing member 29 into engagement with the shoulder 30. Mounted on the upper surface of the latch member 31 is an electrical heating element indicated generally by the numeral 32 which comprises a coil of high resistance wire enclosed in suitable dielectric material. When heated by the element 32 to a degree substantially above normal temperature the latch member 31 is withdrawn from the shoulder 30 and allows the valve head 21 to move from its closed position against seat 20 to closed position against the seat 19.

As shown in Figs. 1 and 2, the branch 13 of the casing 12 communicates with a vertically extending conduit 33 connected at its lower end to a drain pipe 34. This drain pipe may be placed in communication with the bottom or lower portion of a tank 35 containing the water softening material through the branch 13, chamber 14, branch 17 and pipe 18. The upper end of the conduit 33 may be placed in communication with a valve chamber 36 under control of a manually operable valve having a head 37 which is movable downward to engage a seat 38, thereby closing communication between the chamber 36 and upper end of the conduit 33. Spaced upward from the seat 38 is a second seat 39 against which the head 37 may be closed to cut off communication between a valve casing 40 having a branch 41 communicating with a pipe 42 adapted to supply hard water to the apparatus. Another branch conduit 43 is in continuous communication with the chamber 36 and with the upper portion of the tank 35 through a pipe 44 (Fig. 2). A small by-pass pipe 45 connects the branch 41 of the casing 40 with the branch 15 of the casing 12 and is so restricted that only a minute amount of water sufficient to balance the pressure on the opposite faces of the valve head 21 is allowed to pass from the hard water supply to the service pipe.

The valve head 37 is mounted on the lower end of an operating rod 46 which projects from the upper end of the casing 40 and is provided with a handle 47. The rod 46 has a suitable threaded connection with the casing 40 so that when the handle 47 is turned the head 37 may be moved to and from the several seats 38 and 39.

The tank 35 containing the water softening material, e. g., granular zeolites either synthetic or natural, is provided with a manually removable cover or cap for a top opening through which a charge of regenerating material, e. g., common salt, may be fed to the top surface of the softening material when regeneration is required. During the normal water softening operation the valve head 21 remains closed against its seat 19 and the valve head 37 is closed against its lower seat 38 so that hard water passes into the upper portion of the tank 35 from the pipe 42 through the branch 41, casing 40, branch 43 and pipe 44. In passing downward through the softening material in the tank 35, the water is softened and flows from the bottom of the tank up through the pipe 18 and branch 17 and thence past the valve seat 20 through the branch 15 and service pipe 16.

When it is desired to regenerate the body of softening material in the tank 35, the valve handle 47 is turned upward to cut off the passage of hard water to the softening tank and the tank cap or manhole cover (not shown) is removed and water is allowed to drain from the top of the tank through the pipe 44, branch 43, conduit 33 and drain pipe 34, thereby leaving water in the tank to the elevation of the pipe 44. Thereupon a charge of regenerating material, such as common salt or other required reagent, is placed in the tank 35 through the manhole or cover opening and the cover is closed and secured in place. Valve head 37 is then returned to its normal position, i. e., to close against seat 38.

To set our improved time control for the regenerating and flushing cycle, the operator actuates the handle 28 of the plunger 26 to close the valve head 21 against its seat 20, as shown in Fig. 3. The thrust of the plunger 26 is transmitted to the head 25 of the rod 22 through the relatively stiff spring 27. When the annular shoulder 30 on the plunger 26 passes the latch member 31, the latter springs into locking engagement with the plunger to thereby hold the head 21 in closed position against the seat 20 and open communication between the drain pipe 34 and pipe 18 through the restricted passage 13a and chamber 14.

With the valve head 21 closed against its seat 20, regeneration of water softening material in the tank 35 takes place during a predetermined period of time by reason of the fact that hard water from the pipe 42 flows into the upper portion of the tank 35 through the branch 41, casing 40, chamber 36, branch 43 and pipe 44 and carries the brine or other regenerating solution downward through the body of water softening material. The spent solution flows upward from the bottom of the tank through the pipe 18 and then passes through the chamber 14, restricted passage 13a, conduit 33 and drain pipe 34. This spent solution is followed by flushing water and the duration of the regenerating and flushing operation may be determined by either of the time controls hereinafter described. During regenerating and flushing the pressure on opposite faces of the valve head 21 is balanced by allowing a small amount of water to flow from the pipe 42 through the by-pass pipe 45 into the branch 15 while the opposite face of the head 21 is subject to the same fluid pressure. This insures against the holding of the head 21 in contact with its seat 20 with sufficient fluid pressure to prevent the expansion of the spring 24 when the head 21 and rod 22 are released by withdrawal of the latch member 31. Operation of this heat responsive latch may be controlled by various types of automatic timing devices of which the devices shown in Figs. 4 to 10 of the drawings are examples.

Figures 4 to 7 inclusive illustrate a timing device which may be controlled by an electric switch associated with the latch member 31 shown in Figs. 1 and 3. This switch comprises a pair of parallel spring switch members indicated by the numerals 48 and 49 separated, one from the other, by a block of insulating material 50 and also insulated from the latch member 31. The members 48 and 49 are provided with contact points 51 and a finger 52 projects from an end of the member 49 to engage the latch member 31. Thus when the member 31 is in its raised or inoperative position shown in Fig. 1 the contact points 51 are separated and when in the latching or operative position shown in Fig. 3 contact is made between the points 51 to close the control circuit.

As shown in Figs. 4, 5 and 6, we provide a metallic block 53 adapted to gradually absorb heat and this block is associated with a heating coil 54 and mounted on an insulating base 55. Bimetallic switch members 56 and 57 are anchored at their upper ends on the block 53 and normally extend in contact with opposite sides of the block. When the block is heated to a predetermined degree, the lower ends of the members 56 and 57 move away from the block. A fixed switch member 58 is associated with the member 57 to close a switch at points 57a when the member 57 is in its normal position. Formed on the free end of the member 56 is a finger 56a arranged to actuate a resilient switch member 59 and the latter is adapted to make contact with a toggle switch member 60 which is movable between the member 59 and a fixed contact member 61. A manually operable pin 62 is mounted on the base 55 to be manipulated to move the member 60 from contact with the member 61 to contact with the member 59. A small coiled spring 63 is fastened at one end on a suitable support and at the other end is connected to the switch member 60 to hold it in firm contact with either of the switch members 59 or 61.

As indicated diagrammatically in Fig. 7, current may be supplied to the time control through a transformer indicated generally by the numeral 64. The input or primary coil 65 may be supplied from an ordinary domestic lighting circuit outlet and the secondary coil 66 is adapted to furnish current at suitable low voltage for the control switches and heating elements. The indicated wiring includes a wire 67 extending from one side of the secondary coil 66 to the switch member 60, a wire 68 connecting the switch member 61 to the switch member 57, a wire 69 extending from the switch member 58 to one terminal of the heating element 32, a wire 70 extending from the other terminal of element 32 to the switch member 49, a wire 71 connecting the member 49 to a terminal of the heating element 54, a wire 72 connecting the opposite terminal of the element 54 to the switch member 59 and a wire 73 connecting the second terminal of the coil 66 to the switch member 48.

During the normal water softening operation the circuit is closed between the switch members 60 and 61 and also between the switch members 57 and 58 and is open between the members 48 and 49, as indicated in Fig. 7. To set the electrical time control illustrated in Figs. 1 to 7 inclusive in operation, the plunger handle 28 is moved to close the valve head 21 against its seat 20, thereby allowing the latch member 31 to move downward and closing the contacts 51 between the switch members 48 and 49 and then the pin 62 (Figs. 4 and 5) is actuated to move the switch member 60 to close the circuit contact with the member 59. Current now passes through the heating coil 54 so that the block 53 is heated gradually and the free ends of the bi-metallic members 56 and 57 are caused to move away from the block. The resulting movement of switch member 57 opens the circuit at contacts 57a and after a predetermined period of time the member 56 actuates switch members 59 and 60 far enough to cause the toggle member 60 to open the contact with circuit member 59 and close the contact with member 61. As long as the circuit remains open between the switch members 57 and 58 the heating element 32 remains inoperative. After the elapse of a further period of time the block 53 and bi-metallic member 57 cool sufficiently so that the latter member returns to the member 58 thereby closing the circuit including the heating element 32. Thereupon the element 32 heats the latch member 31 and causes it to withdraw from engagement with the plunger 26 and to open the circuit at contacts 51. When the plunger is released it moves to the right (Fig. 3) and allows the spring 24 to actuate the valve head 21 to open the valve at the seat 20 and close it at the seat 19. This movement of the valve occurs instantaneously and returns the apparatus to water softening operation.

By the proper design of the heating elements 32 and 54 and the block 53, the duration of the regenerating and flushing operation may be accurately predetermined. For water softening apparatus requiring regenerating and flushing for a period of approximately thirty minutes, for example, the control may be so designed that the block 53 is heated for approximately fourteen minutes before contact between the members 59 and 60 is broken and an additional fourteen minutes is required for cooling of the block sufficient to cause the member 57 to return to close contacts 57a with the member 58. The heating element 32 and latch member 31 may require approximately two minutes heating time to cause this latch member to release the valve mechanism.

In the form of time control shown in Figs. 8 to 11 inclusive, a synchronous electric motor 74 is arranged to operate a shaft 75 through suitable speed reducing mechanism mounted in a casing 76. The shaft 75 is thereby driven so that it makes one revolution in the time required for regeneration and flushing or slightly in excess of such time. For domestic water softening apparatus the shaft 75 may be so driven that it makes approximately one revolution in 45 minutes. Fixed on the shaft 75 are cams 77 and 78 and on an end thereof is a manually operable knob 79 carrying a pointer 80 which is adapted, by reference to a time scale 81 on a dial 82, to indicate the elapse of time in minutes. The shaft 75 has a friction drive connection with the speed reducing mechanism in the casing 76 so that by manipulating the knob 79 the shaft 75 and cams 77 and 78 carried thereby may be turned independently of the motor driven driving mechanism.

As shown in Fig. 10, a suitable electric circuit for the motor-driven timing mechanism may comprise current supply wires 83 and 84 connected respectively to a terminal of the motor 74 and the primary coil of a transformer 85. From the motor a wire 86 extends to a switch contact member 87 associated with a cam operated switch member 88 and a wire 89 connects the member 88 to the second terminal of the transformer primary coil. This transformer supplies current at a reduced voltage from a secondary coil which is connected in series with a heating element 90, a switch contact member 91 and a cam-actuated switch member 92. Cam 78 is formed with a peripheral notch 93 and a periphery which is concentric to shaft 75. A finger 94 projects from the member 92 and is spring biased to slidably engage the periphery of the cam and to enter the notch 93. Except when the notch 93 is in registry with the finger 94, the circuit is held open between the contact 91 and member 92. Cam 77 is formed with a projecting finger 95 which is adapted to actuate the switch member 88 to open the circuit at the contact member 87, the member 88 being spring biased to close against the contact member 87. As shown in Fig. 11, the heating element 90 is enclosed in a suitable dielectric envelope and is mounted on the outer surface of the latch member 31 so that the latter is heated when the latch is energized. Overlying the outer surface of the heating element 90 is a bi-metallic strip 96 which reinforces the latch member 31 and promotes positive, flexible operation.

When the apparatus is in water softening operation, the cams 77 and 78 are in the positions indicated in Fig. 10 so that the motor and heating circuits are open. To start the time control shown in Figs. 8 to 11 inclusive, the operator merely sets the pointer 80 to the point on the scale 81 corresponding to the time required for the regenerating and flushing operation. For example, if the time required is thirty minutes, the operator sets the pointer at the corresponding point on the dial and thereby turns the cams 77 and 78 to positions which allow the switch member 88 to close the circuit at the contact 87 and to hold the heating circuit including the element 90 open between the switch member 92 and contact member 91. This starts the electric motor 74 which turns the shaft 75 slowly, together with the cams, toward their starting positions. Shortly before the end of the thirty minute or other selected period, the finger 94 of the switch member 92 enters the notch 93 in the cam 78 thereby causing the switch member 92 to close the circuit including the heating element 90 while the motor continues to operate. Thereupon the element 90 heats the bi-metallic strip 96 and latch member 31 to cause the latter to be withdrawn from the annular shoulder 30 and releasing the plunger 25 so that the valve head 21 returns to normal water softening position. The motor 74 continues to operate until the cam finger 95 actuates the switch member 88 to open the motor circuit, as indicated in Fig. 10. By this time cam 78 has actuated the switch member 92 to open the heating circuit including the element 90.

The latch 31 and associated strip 96 are preferably enclosed in a protective casing and another casing 97 is provided to enclose the transformer 85, motor 74, shaft 75, casing 76, cams 77 and 78 and the associated switch members 88 and 92 and circuit wires. Casing 97 may be mounted on any suitable support or wall more or less remote from the softening apparatus so that the control is not affected by the presence of the moisture or regenerating material on the outer surfaces of the valves, piping and tank.

For the control shown in Figs. 1 to 7 inclusive the latch 31 and associated switch members 42 and 49 are preferably enclosed in a protective casing indicated diagrammatically by the broken line 99 in Fig. 7 and another casing indicated by the broken line 98 may be used to enclose the block 53 and associated switch members, heating element and circuits.

Our electric time controls associated with a heat responsive latch member are reliable in operation and particularly adapted for use in the semi-automatic control of domestic water softening apparatus. It will be evident that our control embodying an electric clock or synchronous motor affords flexibility to meet the special requirements of particular installations where the time required for regenerating and flushing may vary.

By causing the valve head 21 to move instantaneously from the regenerating and flushing position to the water softening position, we prevent the drawing of brine or regenerating solution into the service pipe and minimize the care and skill required for completely satisfactory operation of the controls.

Having described our invention, what we claim as new and desire to protect by Letters Patent is:

1. In water softening apparatus, means for controlling the successive operations of softening and regenerating comprising, a two-way, three-port valve, manually operable means for actuating said valve to terminate the softening operation and initiate the regenerating operation, means for actuating said valve to terminate the regenerating operation and initiate the softening operation, heat responsive control means for said valve, electrical heating means associated with said heat responsive control means and electrical means for controlling the duration of the regenerating operation associated with said heating means.

2. In water softening apparatus, valve means for controlling the successive operations of softening and regenerating, manually operable means for actuating said valve means to terminate the softening operation and initiate the regenerating operation, resilient means for actuating said valve means to terminate the regenerating and initiate the softening operation, heat responsive means adapted to retain said valve means in regenerating position, electrical heating means associated with said heat responsive means and electrical timing means operatively connected to said heating means for controlling the duration of the regenerating operation.

3. In water softening apparatus, valve means for controlling the successive operations of softening and regenerating, manually operable means for actuating said valve means to terminate the softening operation and initiate the regenerating operation, means including a bimetallic heat responsive element for actuating said valve means to terminate the regenerating and initiate the softening operation, electrical heating means associated with said heat responsive element and electrical timing means operatively connected to said heating means for controlling the duration of the regenerating operation.

4. In water softening apparatus, valve means for controlling the successive operations of softening and regenerating, manually operable means for actuating said valve means to terminate the softening operation and initiate the regenerating operation, means including a heat responsive element for actuating said valve means to terminate the regenerating and initiate the softening operation, an electrical heating coil associated with said heat responsive element and timing means for controlling the duration of the regenerating operation comprising, a circuit including said coil, heat responsive controls for closing and opening said circuit, a heat storage element associated with said heat responsive controls and operative to delay the closing of said circuit and electrical means for heating said heat storage element.

5. In water softening apparatus, valve means for controlling the successive operations of softening and regenerating, manually operable means for actuating said valve means to terminate the softening operation and initiate the regenerating operation, means including a heat responsive element for actuating said valve means to terminate the regenerating and initiate the softening operation, an electrical heating coil associated with said heat responsive element and timing means for controlling the duration of the regenerating operation comprising, a circuit including said coil, switch means for closing and opening said circuit and clock operated means for actuating said switch means.

LYNN G. LINDSAY.
LE ROY A. NELSON.

REFERENCES CITED

The following references are of record in the file of this patent:

UNITED STATES PATENTS

| Number | Name | Date |
| --- | --- | --- |
| 1,704,982 | Lindsay | Mar. 12, 1929 |
| 1,920,973 | Dinzl | Aug. 8, 1933 |
| 2,118,443 | McCorkle | May 24, 1938 |
| 2,282,244 | Ransome | May 5, 1942 |
| 2,292,801 | Slidell | Aug. 11, 1942 |
| 2,347,201 | Lindsay | Apr. 25, 1944 |